H. WEBSTER.
Whiffletree.
No. 78,034.  Patented May 19, 1868.
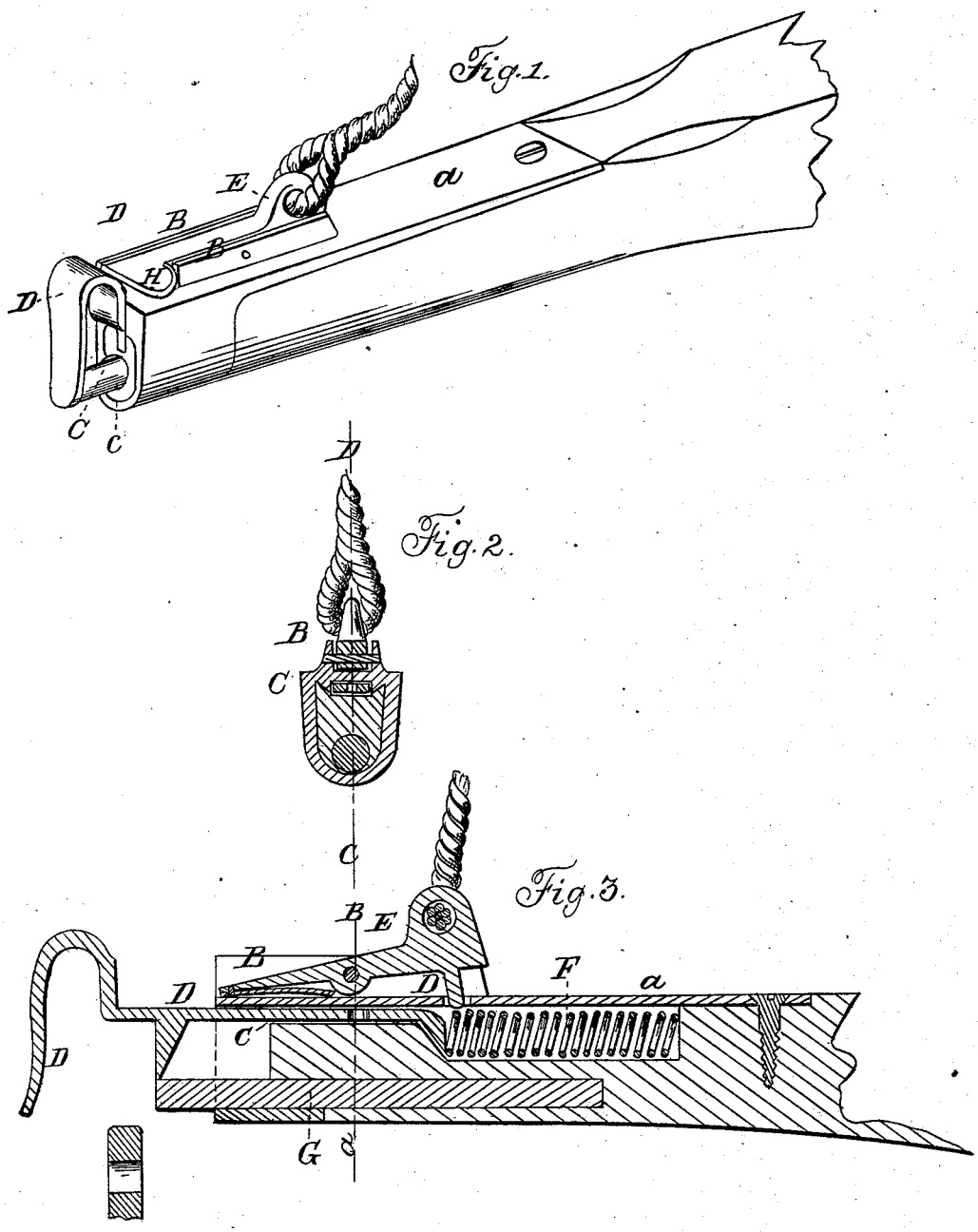

United States Patent Office.

HARVEY WEBSTER, OF CAMBRIDGE, VERMONT.

Letters Patent No. 78,034, dated May 19, 1868.

IMPROVEMENT IN WHIFFLE-TREE.

*The Schedule referred to in these Letters Patent and making part of the same.*

TO ALL WHOM IT MAY CONCERN:

Be it known that I, HARVEY WEBSTER, of Cambridge, in the county of Lamoille, and State of Vermont, have invented certain Improvements in Whiffle-Trees; and I do hereby declare that the following is a full and exact description thereof, reference being had to the accompanying drawings, and the letters of reference marked thereon Figure 1, perspective, showing back and under side.

Figure 2, transverse section on line A B, fig. 3.

Figure 3, longitudinal section on line C D, fig. 2.

To enable others skilled in the art to make and use my invention, I will proceed to describe its construction and operation.

The improvements that I claim consist in the extended band A, with grooves B and C, the groove C preventing the swelling or other action of the wood affecting the play or operation of the cast-off D; the groove B acting as a guard to the spring-lever E, and preventing the same from being accidentally opened or sprung, also acting as a guard against ice and mud, thereby rendering the present device practicable, wherein the other, as patented by H. & A. Webster, under date of May 29, 1855, was impracticable. I claim also the further improvement in the form of the cast-off, and the form and position of the spring-lever catch E, as also the manner of fastening the cast-off D.

In the construction, I retain the form and action of the spring F, as also the draught-pin G, all as described in Letters Patent granted as above. The remainder of the device, or that part that I claim as my improvement, is constructed substantially in the manner shown.

In the operation of my device, it is in all respects similar to the patent granted as above, except that I add to the spring-lever catch E the thumb-plate H, for the purpose of operating the lever with the hand, and independent of the cord.

What I claim, and desire to secure by Letters Patent, is—

The plate A, with its grooves B and C, the spring-lever E, cast-off D, the spring F, and draught-pin G, all arranged and operated as shown and described.

HARVEY WEBSTER.

Witnesses:
H. C. GILBERT,
H. J. STOWELL.